No. 744,066. PATENTED NOV. 17, 1903.
M. R. GUSTIN.
AXLE.
APPLICATION FILED FEB. 6, 1903.
NO MODEL.
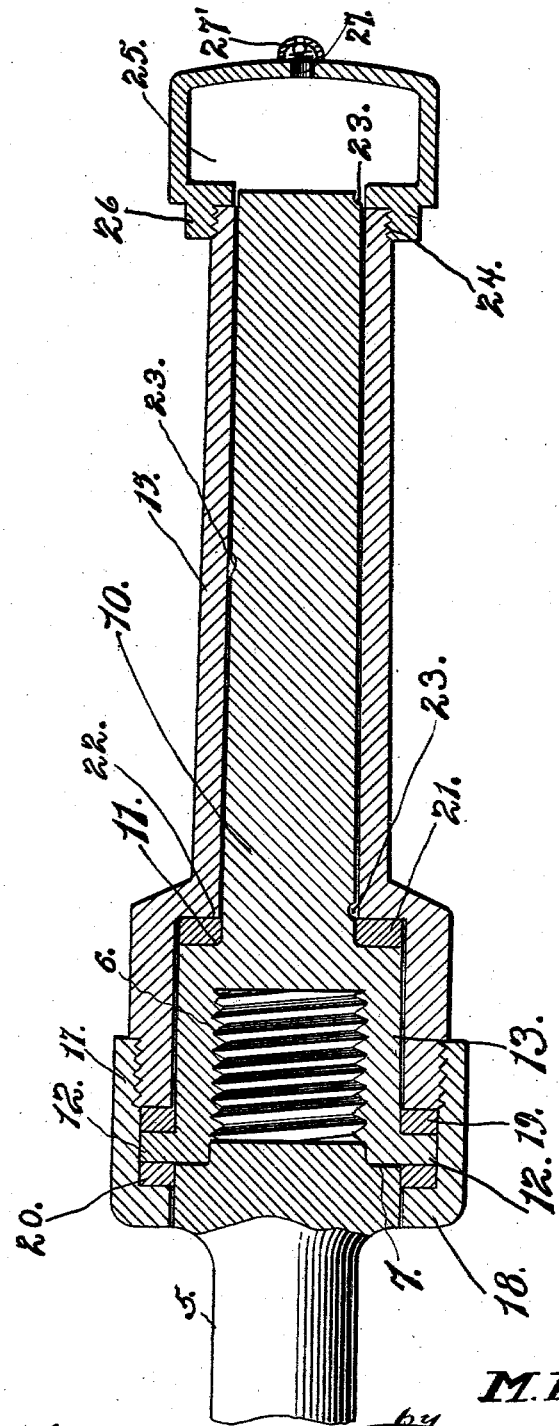
Witnesses
Inventor
M. R. Gustin.

No. 744,066. Patented November 17, 1903.

UNITED STATES PATENT OFFICE.

MAHLON R. GUSTIN, OF SULLIVAN, INDIANA, ASSIGNOR OF ONE-HALF TO GILBERT BOND, OF SULLIVAN, INDIANA.

AXLE.

SPECIFICATION forming part of Letters Patent No. 744,066, dated November 17, 1903.

Application filed February 6, 1903. Serial No. 142,203. (No model.)

*To all whom it may concern:*

Be it known that I, MAHLON R. GUSTIN, a citizen of the United States, residing at Sullivan, in the county of Sullivan, State of Indiana, have invented certain new and useful Improvements in Axles; and I do hereby declare the following to be a full, clear, and exact description of the invention, such as will enable others skilled in the art to which it appertains to make and use the same.

This invention relates to axles for vehicles; and it has for its object to provide a construction wherein the spindle will be efficiently lubricated and in which the wheel will be held in such manner upon the spindle as to preclude ingress of foreign matter to the bearing-surfaces, as well as egress of the lubricant.

A further object of the invention is to provide a construction wherein the wheel will be retained upon the spindle by engagement of a nut with the rear portion or inner end of the box thereof instead of with the outer end of the spindle, as is usual.

Other objects and advantages of the invention will be understood from the following description.

In the drawing forming a portion of this specification there is shown a longitudinal section of the end portion of an axle with a spindle attached thereto and having a wheel-box mounted thereon, the spindle being provided with a lubricating box or chamber.

Referring now to the drawing, there is shown a portion of an axle 5, having its end portion 6 threaded and in the rear of which threaded portion is formed a flange 7, which circumscribes the axle, as shown. The outer face of this flange 7—that is, the face in the direction of the free end of the axle—is at a right angle to the axis of the axle, while the outer or curved face of the flange is concentric with the axle and is cylindrical.

On the threaded end of the axle is screwed a spindle 10, the inner end of which is enlarged and has a terminal threaded recess for this purpose, the enlargement being bounded at its outer end by the abrupt shoulder 11. At the inner end of the enlargement of the spindle is formed the circumscribing flange 12, which is rectangular in cross-section and projects at right angles to the cylindrical outer face of the enlargement. It will be noted that the diameters of the enlargement 13 of the spindle and the flange 7 are the same.

Upon the spindle is disposed the box 15 of a wheel, said box being engaged with the hub in the usual manner, said box including the outer reduced portion which fits upon the reduced end of the spindle and the enlarged inner portion which fits upon the enlarged inner end of the spindle, the enlarged inner end portion of the box being exteriorly threaded at its free end, as shown, to receive an internally-threaded sleeve 17, which is screwed thereon after the box is applied to the spindle. The inner end of the sleeve 17 has an inwardly-directed flange 18, which lies behind the flange 12 closely encircling said flange and bearing against the cylindrical face thereof. To prevent ingress of foreign matter and egress of lubricant, washers 19 and 20 are disposed, one between the inner end of the wheel-box and the outer face of the flange 12, and the other between said flange 12 and the inner face of the flange 18, and by screwing the sleeve 17 upon the inner end of the box the washers are compressed to a greater or lesser degree. A washer 21 is disposed upon the minor portion of the spindle, against the outer face of the enlarged portion of the spindle and between said face and the shoulder 22 at the inner end of the enlarged bore of the box, so that when the box is drawn upon the spindle said washer will also be compressed. These several washers prevent ingress of foreign matter, while the washer 21 serves also to prevent excessive flow of lubricant from the minor portion of the box to the major portion thereof under centrifugal action.

The sleeve that is engaged with the box prevents the latter from displacement from the spindle.

In the cylindrical face of the spindle is formed a helical oil-channel 23, which opens at one end through the end of the spindle and terminates at its opposite end at the washer 21, this channel acting to convey the lubricant longitudinally of the spindle, so that it will be properly distributed.

The outer end of the wheel-box is exteriorly threaded, as shown at 24, and on this threaded end is screwed an oil-cup 25, engagement of the cup with the box being effected through the medium of the interiorly-threaded annular flange 26 on the face of the cup. In the face of the cup within the inclosure of the flange is an opening having the same diameter as the minor portion of the spindle to permit of passage of the lubricant from the cup to the spindle, and in the opposite face or outer end of the cup is an opening 27, having a spring-pressed closure 27', through which oil may be introduced.

The oil-cup prevents ingress of foreign matter at the outer end of the spindle.

In practice modifications of the specific construction shown may be made and any suitable materials and proportions may be used for the various parts without departing from the spirit of the invention.

What is claimed is—

The combination with an axle having its end threaded and having a circumscribing flange in the rear of the threaded portion, of a spindle comprising an outer reduced portion and an enlarged inner portion, said enlarged portion being interiorly threaded for the reception of the threaded portion of the spindle to permit of adjusting the spindle upon the axle, said enlarged portion also having a circumscribing flange at its inner end projecting beyond the flange of the axle, a box disposed upon the spindle and terminating short of the last-named flange, a sleeve screwed upon the inner end of the box and extending beyond the flange of the spindle and adapted for adjustment thereon toward and away from the circumscribing flange of the spindle, said sleeve having an inwardly-directed flange hugging the flange of the axle, washers disposed between the enlargement of the spindle and the box and other washers disposed at opposite sides of the flange of the spindle.

In testimony whereof I affix my signature in presence of two witnesses.

MAHLON R. GUSTIN.

Witnesses:
HERBERT GUSTIN,
T. R. DUTTON.